(12) United States Patent
Enigma

(10) Patent No.: US 10,785,495 B1
(45) Date of Patent: Sep. 22, 2020

(54) ENCODING TIMECODE IN VIDEO USING COLORED REGIONS OF PIXELS

(71) Applicant: Amazon Technologies, Inc., Seattle, WA (US)

(72) Inventor: Brian Enigma, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/714,583

(22) Filed: Sep. 25, 2017

(51) Int. Cl.
  *H04N 19/46* (2014.01)
  *H04N 19/186* (2014.01)
  *H04N 19/176* (2014.01)
  *H04N 19/44* (2014.01)
  *H04N 19/625* (2014.01)

(52) U.S. Cl.
  CPC ........... *H04N 19/46* (2014.11); *H04N 19/176* (2014.11); *H04N 19/186* (2014.11); *H04N 19/44* (2014.11); *H04N 19/625* (2014.11)

(58) Field of Classification Search
  CPC ...... G06Q 30/018; G06T 15/00; H04N 7/183; H04N 21/44; H04N 19/46; H04N 19/176; H04N 19/186; H04N 19/44; H04N 19/625; H04N 21/44008
  USPC .............. 375/240.08; 348/143, 512; 345/419
  See application file for complete search history.

(56) References Cited

U.S. PATENT DOCUMENTS

| | | | | |
|---|---|---|---|---|
| 6,584,125 | B1* | 6/2003 | Katto | H04N 7/52 348/512 |
| 9,516,303 | B2* | 12/2016 | Gong | H04N 21/44008 |
| 2013/0162638 | A1* | 6/2013 | Kunihara | G06T 15/00 345/419 |
| 2015/0035977 | A1* | 2/2015 | Schrepfer | H04N 7/183 348/143 |
| 2017/0292933 | A1* | 10/2017 | Rilum | G06F 3/147 |
| 2017/0300925 | A1* | 10/2017 | Atkinson | G06F 3/147 |
| 2018/0204219 | A1* | 7/2018 | Elshishiny | G06Q 30/018 |
| 2018/0316910 | A1* | 11/2018 | Kashibuchi | H04N 13/332 |

* cited by examiner

*Primary Examiner* — Albert Kir
(74) *Attorney, Agent, or Firm* — Lee & Hayes, P.C.

(57) ABSTRACT

Timecode is encoded in video using colored regions of pixels. Pixels in adjacent regions in frames of a video are color-coded to encode timecode. For example, two adjacent regions might both be colored red to encode the numeral '0.' As another example, two adjacent regions might be colored red and purple, respectively, to encode the numeral '1.' The regions can be the same size as a macroblock (e.g. 16×16 pixels) used by a video encoder and aligned to macroblock boundaries for efficient encoding. The colors of the adjacent regions can be decoded to obtain the timecode. The timecode might then be burned into frames of the video, displayed non-destructively over the video, or used in another manner.

20 Claims, 9 Drawing Sheets

ENCODING TIMECODE IN VIDEO USING COLORED REGIONS OF PIXELS

BACKGROUND

Timecode is used extensively in video and film production for synchronization, and for logging and identifying material in recorded media. Timecode is commonly placed alongside video as metadata. However, in certain scenarios the alignment of such sideband timecode cannot be trusted to match corresponding frames in the associated video.

Timecode is also commonly "burned into" source video. Burnt-in timecode ("BITC") is human-readable on-screen timecode that is superimposed into frames of video. In many cases, BITC is subsequently extracted from video using optical character recognition ("OCR") techniques.

OCR techniques for extracting BITC from video can, however, be computationally intensive and, as a result, can use significant computing resources. OCR techniques for extracting BITC can also be inaccurate, thereby leading to errors in the timecode output by the OCR process.

Additionally, because BITC adds on-screen numerals to video that change from frame-to-frame, encoding and decoding (and other types of transcoding) of video containing BITC is more complex than encoding and decoding video without BITC. This can also result in the additional use of computing resources, such as processor cycles and memory, as compared to encoding and decoding video that does not contain BITC. The disclosure made herein is presented with respect to these and other technical considerations.

DETAILED DESCRIPTION

Figure 1:
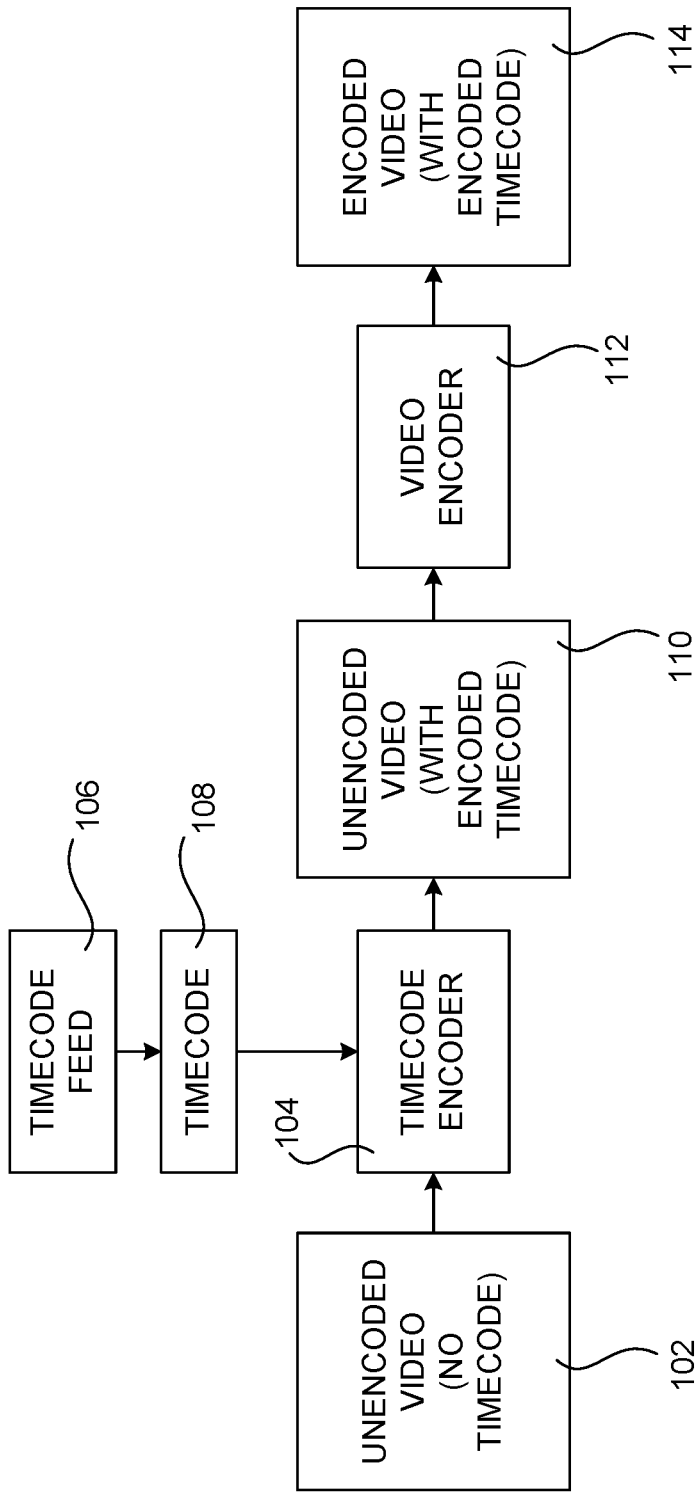
FIG. 1 is a software architecture diagram showing aspects of the operation of a timecode encoder configured to encode timecode in unencoded video using colored regions of pixels, according to one particular configuration.

The following detailed description is directed to technologies for encoding timecode in unencoded video using colored regions of pixels. Through an implementation of the disclosed technologies, timecode can be encoded in video by setting color values for adjacent regions of pixels within frames of the video.

Timecode that has been encoded using the technologies disclosed herein can subsequently be decoded from the video by analyzing the colored regions of pixels in the frames of the video. This mechanism can eliminate the need to "burn-in" timecode and, as a result, can also eliminate the need to perform OCR on BITC. This reduces the utilization of computing resources, such as processor cycles and memory. This can also improve the computational performance of encoding and decoding operations as compared to video that includes BITC. Technical benefits other than those specifically mentioned herein can also be realized through an implementation of the disclosed technologies.

In one configuration disclosed herein, a timecode encoder is provided that can encode timecode in a video by setting color values for pixels in adjacent regions in frames of the video. For example, two adjacent regions of pixels might both be colored red to encode the numeral '0.' As another example, two adjacent regions of pixels might be colored red and purple, respectively, to encode the numeral '1.' Other numerals can be encoded in a similar fashion. In one embodiment, the regions are the same size as a macroblock (e.g. 16×16 pixels) used by a video encoder and are aligned to macroblock boundaries for efficient encoding. Other region sizes can be utilized in other embodiments.

The colors of the adjacent regions of pixels in the frames of the video can subsequently be decoded to obtain the timecode. The timecode might then be burned-into frames of the video, displayed non-destructively over the video, or used in another manner. Additional details regarding the various components and processes described briefly above for encoding timecode in unencoded video using colored regions of pixels will be presented below with regard to FIGS. 1-7.

It should be appreciated that the subject matter presented herein can be implemented as a computer process, a computer-controlled apparatus, a computing system, or an article of manufacture, such as a non-transitory computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings are not drawn to scale. Like numerals represent like elements throughout the several figures (which might be referred to herein as a "FIG." or "FIGS.").

FIG. 1 is a software architecture diagram showing aspects of the operation of a timecode encoder 104 configured to encode timecode 108 in unencoded video 102 using colored regions of pixels, according to one particular configuration. As discussed briefly above, timecode 108 is used extensively in video and film production for synchronization, and for logging and identifying material in recorded media. Timecode is commonly "burned into" source video. Burnt-in timecode ("BITC") is human-readable on-screen timecode that is superimposed into frames of video. BITC can, for example, provide a human-readable on-screen indication of hours, minutes, seconds, and frames (e.g. 01:02:03:04). In many cases, BITC is subsequently extracted from video using optical character recognition ("OCR") techniques.

As also discussed briefly above, OCR techniques for extracting BITC from video can, however, be complex and use significant computing resources. OCR techniques for extracting BITC can also be inaccurate, thereby leading to errors in the timecode metadata output by the OCR process. Additionally, because BITC adds numerals to video that change from frame-to-frame, encoding and decoding of video containing BITC is more complex than encoding and decoding video without BITC. This can also result in the additional use of computing resources, such as processor cycles and memory, as compared to encoding and decoding video that does not contain BITC.

In order to address these technical challenges, and potentially others, a timecode encoder 104, is provided that can encode timecode 108 in unencoded video 102 by setting color values for pixels in adjacent regions in frames of the unencoded video 102. For example, and as described in greater detail below with regard to FIG. 2B, two adjacent regions of pixels in frames of the unencoded video 102 might both be colored red to encode the numeral '0.' As another example, two adjacent regions of pixels in frames of the unencoded video 102 might be colored red and purple, respectively, to encode the numeral '1.' Use of these two colored regions in combination can, in this manner, encode the numeral '01.' Use of multiple such regions can be utilized to encode the hours, minutes, seconds, and frame number of each frame in an unencoded video 102. In this regard, it is to be appreciated that timecode 108 need not be encoded in every frame of the unencoded video 102. Only even or odd frames might be encoded, for example. Timecode 108 for frames that have not been encoded with timecode 108 can be inserted into the video 102 or otherwise generated during decoding or subsequent playback.

A timecode decoder 404 (shown in FIG. 4 and described below) is also provided that can decode timecode 108 that has been encoded in the manner described above to obtain the encoded timecode 108. The timecode decoder 404 might be implemented within a video decoder 402, standalone, or a part of another component. The timecode 108 might then be burned-into frames of the video to create BITC, displayed non-destructively over the video, or used in another manner. Additional details regarding the configuration and operation of the timecode encoder 104 are provided below with regard to FIGS. 2A-3. Additional details regarding the configuration and operation of the timecode decoder 404 are provided below with regard to FIGS. 4-6.

Figure 2A:
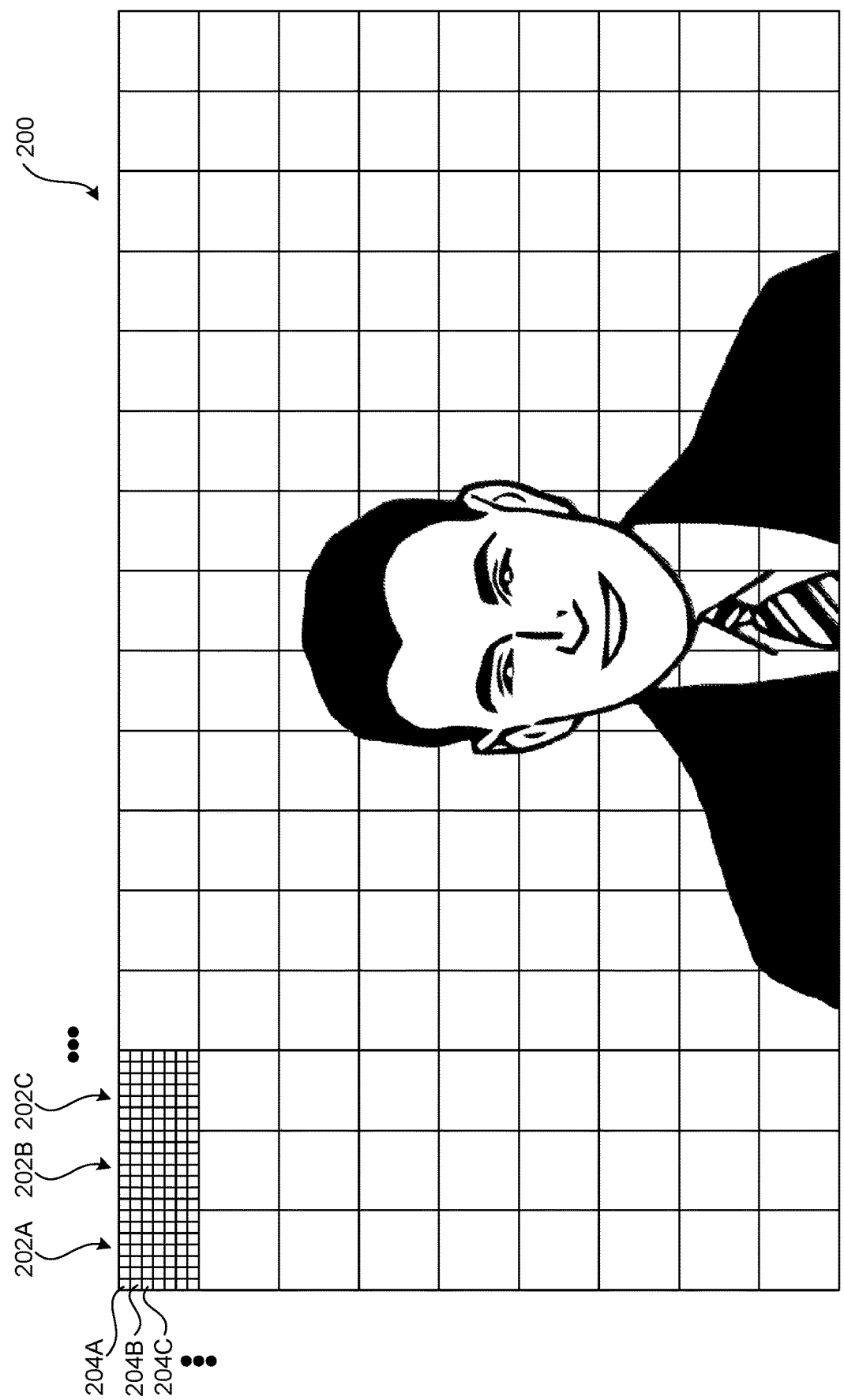
FIG. 2A is a screen diagram showing aspects of one frame of an unencoded video, according to one particular configuration.

As illustrated in FIG. 1 and described briefly above, the timecode encoder 104 can receive unencoded video 102 that contains no timecode 108. The unencoded video 102 can include BITC in some embodiments. The unencoded video 102 is organized as a sequence of frames, each of the frames having a number of pixels. FIG. 2A, for example, is a screen diagram showing aspects of one frame 200 of the unencoded video 102, according to one particular configuration.

As shown in FIG. 2A, the frame 200 can be subdivided into regions 202A-202C (not all of the regions 202 have been numbered in FIG. 2A for the sake of clarity). In one particular embodiment, the regions 202A-202C are the same size as a macroblock utilized by a video encoder 112. A macroblock is a processing unit in image and video compression formats based on linear block transforms, such as the discrete cosine transform ("DCT"). A macroblock commonly consists of 16×16 pixels 204A-204C (not all of the pixels 204 have been illustrated or numbered in FIG. 2A for the sake of clarity). Macroblocks can be further subdivided into transform blocks, and may be yet further subdivided into prediction blocks.

In embodiments where the regions 202 are the size as macroblocks used by the video encoder 112, the regions 202 can also be aligned to boundaries of the macroblocks used by the video encoder 112. Using colored regions 202 that are the size of a typical macroblock (e.g. 16×16 pixels) and aligned such that they do not span macroblock borders can make compression of the frames 200 of the video more efficient (as compared to BITC and to embodiments where the regions 202 are not aligned to macroblock borders) and can improve the picture quality of the bordering pixels.

It is to be appreciated that while the embodiments disclosed herein are primarily presented in the context of regions 202 that are the same size as macroblocks used by a video encoder 112 (e.g. 16×16 pixels), the regions 202 can be of other vertical and horizontal sizes in other configurations. The size of the regions 202 is not limited to the size of a macroblock.

As shown in FIG. 1, the timecode encoder 104 can receive a timecode feed 106 that contains the timecode 108. The timecode feed 106 can be generated by a hardware device or a software program. As discussed above, the timecode 108 is commonly expressed as hours, minutes, seconds, and frames.

In order to encode the timecode 108 in frames 200 of the unencoded video 102, the timecode encoder 104 sets color values for pixels in adjacent regions 202 in the frames 200 of the unencoded video 102. As a brief example, four colors might be utilized to encode the timecode 108 in the unencoded video 102: red; purple; green; and blue. In this example, sixteen symbols can be represented by coloring two regions 202 in frames 200 of the unencoded video 102. Example color combinations and their respective symbols are shown in Table 1.

TABLE 1 red, red = 0
red, purple = 1

TABLE 1-continued

```
red, green = 2
red, blue = 3
purple, red = 4
purple, purple = 5
purple, green = 6
purple, blue = 7
green, red = 8
green, purple = 9
green, green = A
green, blue = B
blue, red = C
blue, purple = D
blue, green = E
blue, blue = F
```

In this regard, it is to be appreciated that more or fewer colors and regions 202 can be utilized in various embodiments. In particular, additional symbols can be represented using the same number of regions 202 but more colors. The tradeoff, however, is the increased possibility of false detection after transcoding the video if the selected colors are too visually similar to one another. More robust detection can be obtained by using fewer colors. In this case, however, use of more regions of frames of the unencoded video 102 is required to represent the same number of symbols. For instance, with only two colors (e.g. black and white), the hours, minutes, seconds and frames of the timecode 108 could be represented using a binary numbering scheme.

Figure 2B:
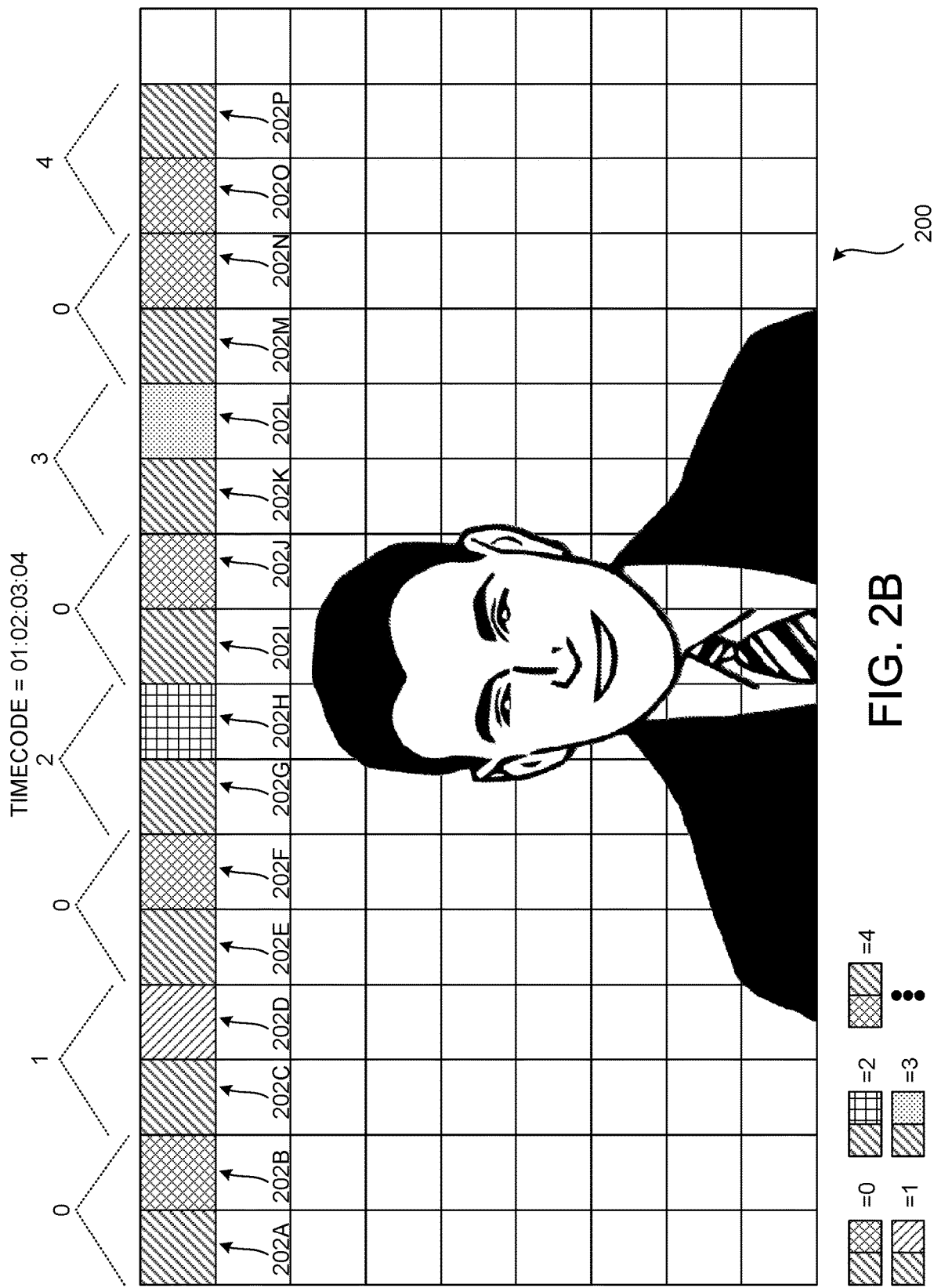
FIG. 2B is a screen diagram showing additional aspects of the frame of unencoded video shown in FIG. 2A following embedding of timecode in the frame using colored regions of pixels, according to one particular configuration.

In some configurations, the regions 202 are located along the top (as shown in FIGS. 2A and 2B) or bottom of the frames 200 of video. In these embodiments, the timecode encoder 104 can insert new rows of pixels having the same height as the regions 202 (e.g. 16 pixels high) in the frames 200 (e.g. at the top or bottom of each frame 200). The timecode encoder 104 can then encode the timecode 108 in the added row of regions 200. The timecode decoder 404, described below, can later remove, by cropping, the added rows of pixels from each frame 200 after the timecode 108 has been decoded. In other embodiments, the regions 202 used to encode the timecode 108 are located vertically along the left side or the right side of the frames 200 of video. The regions 202 can be located in other locations in the frames 200 in other configurations.

In some embodiments, the timecode encoder 104 can also set color values for pixels in adjacent regions 202 in the frames of the unencoded video 102 to encode a per-frame checksum for the timecode 108. In some embodiments, the timecode encoder 104 can also, or alternately, set color values for the pixels in adjacent regions 202 of the unencoded video 102 to encode data indicating that the timecode 108 is encoded in the unencoded video 102 (e.g. a header).

As shown in FIG. 1, the timecode encoder 104 receives the unencoded video 102 and the timecode 108 and encodes the timecode 108 in the frames 200 of the unencoded video 102 in the manner described above. The output of the timecode encoder 104 is an unencoded video 110 that has the timecode 108 encoded therein.

The unencoded video 110 can then be provided to a video encoder 112 that can encode the unencoded video 110 (e.g. using MPEG-4) to generate encoded video 114 that also includes the timecode 108. As will be described below with regard to FIGS. 4-6, a video decoder 402 (shown in FIG. 4) can then decode the encoded video 114 to create a decoded video (not shown in FIG. 1) that includes regions 200 encoding the timecode 108 using color values for the pixels in the regions 200. A timecode decoder 404 can then decode the color values of the pixels in the regions 202 in frames 200 of the decoded video to generate the timecode 108.

FIG. 2B is a screen diagram showing the frame 200 of the unencoded video 102 shown in FIG. 2A following encoding of the timecode 108 therein using colored regions of pixels in the manner described above, according to one particular configuration. In the example shown in FIG. 2B, two regions 202 and four colors are utilized to encoded the timecode 108. The four colors are represented by different hatching patterns in FIG. 2B. A legend for the colors and the symbols they represent is presented at the bottom of FIG. 2B.

In the example shown in FIG. 2B, the timecode 01:02:03:04 has been encoded in the regions 202A-202P. In order to encode this timecode, the colors of regions 202A and 202B have been colored in order to represent a zero. For example, region 202A might be colored red, while region 202B might be colored yellow. The regions 202E and 202F, 202I and 202J, and 202M and 202N have been colored similarly to also represent zeroes.

In the example shown in FIG. 2B, the colors of the pixels in regions 202C and 202D have been set in order to represent the numeral one. For example, region 202C might be colored red, while the region 202D is colored blue. The colors of the pixels in the regions 202G and 202H have been set in order to represent the numeral two. For example, region 202G might be colored red, while the region 202H is colored white. Pixels in the regions 202K and 202L have been colored in order to represent the numeral three. For example, pixels in the region 202K might be colored red, while pixels in the region 202L are colored orange. In a similar fashion, the pixels in the regions 202O and 202P have been colored in order to represent the numeral four. For example, region 202O might be colored purple, while the region 202P is colored red.

It is to be appreciated that the encoding shown in FIG. 2B is merely illustrative and that other numbers of colors and regions can be utilized to encode the timecode 108 in other embodiments. It is also to be appreciated that while a single frame 200 is shown in FIG. 2B, the timecode 108 for other frames 200 of the unencoded video 102 can be encoded in a similar fashion. For instance, the timecode 01:02:03:05 can be encoded in the frame of the video 102 immediately following the frame 200. It is also to be appreciated that while the video shown in the screen displays of FIGS. 2A and 2B does not include BITC, the technologies described herein might also be utilized with video that does contain BITC.

Figure 2C:
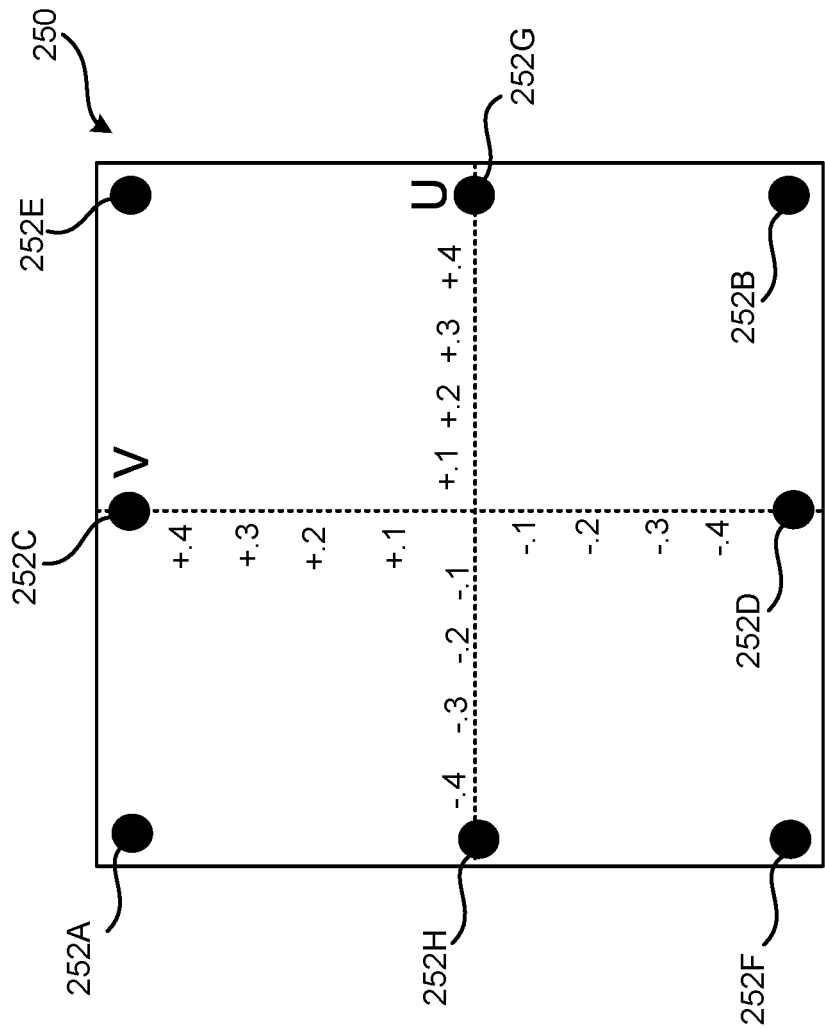
FIG. 2C is a color plane diagram showing aspects of the selection of colors for encoding digits of timecode, according to one particular configuration.

FIG. 2C is a color plane diagram showing aspects of one mechanism for selecting colors for encoding digits of timecode, according to one embodiment. As described briefly above, two or more colors can be utilized to encode the timecode 108. For example, four colors can be utilized to provide a base-4 numbering system. Eight colors or any other number of colors can be utilized in other embodiments.

Regardless of the number of colors utilized to encode the timecode 108, colors can be picked from an available colorspace in order to minimize errors in the timecode 108 caused by incorrect encoding and subsequent decoding of the timecode 108. For example, and as shown in the example color plane 250 shown in FIG. 2C, colors can be picked for representing digits of the timecode 108 that are the furthest away from an immediate neighbor number in the color plane. This way, as the digits of the timecode 108 change from 1 to 2 to 3, etc., more distinct changes (e.g. orange, blue, pink) will take place, rather than gradual changes (e.g. orange to reddish-pink), which the video encoder 112 might ignore or otherwise determine to be insignificant).

In the example shown in FIG. 2C, for instance, eight digits are represented by points 252 on the U-V color plane 250. The points 252A and 252B correspond to the digits '1' and '2', respectively, and are therefore at opposite sides of the color plane 250, diagonally. The points 252C and 252D correspond to the digits '3' and '4', respectively, and are therefore at opposite sides of the color plane 250, vertically. The points 252E and 252F correspond to the digits '5' and '6', respectively, and are therefore at opposite sides of the color plane 250, diagonally. Finally, the points 252G and 252H correspond to the digits '7' and '8', respectively, and are therefore at opposite sides of the color plane 250, horizontally. Other configurations can, of course, be utilized in other embodiments. In some embodiments, the distance between colors on the color plane 250 utilized to represent digits of the timecode 108 varies proportionately with the amount of compression utilized by the video encoder 112.

Figure 3:
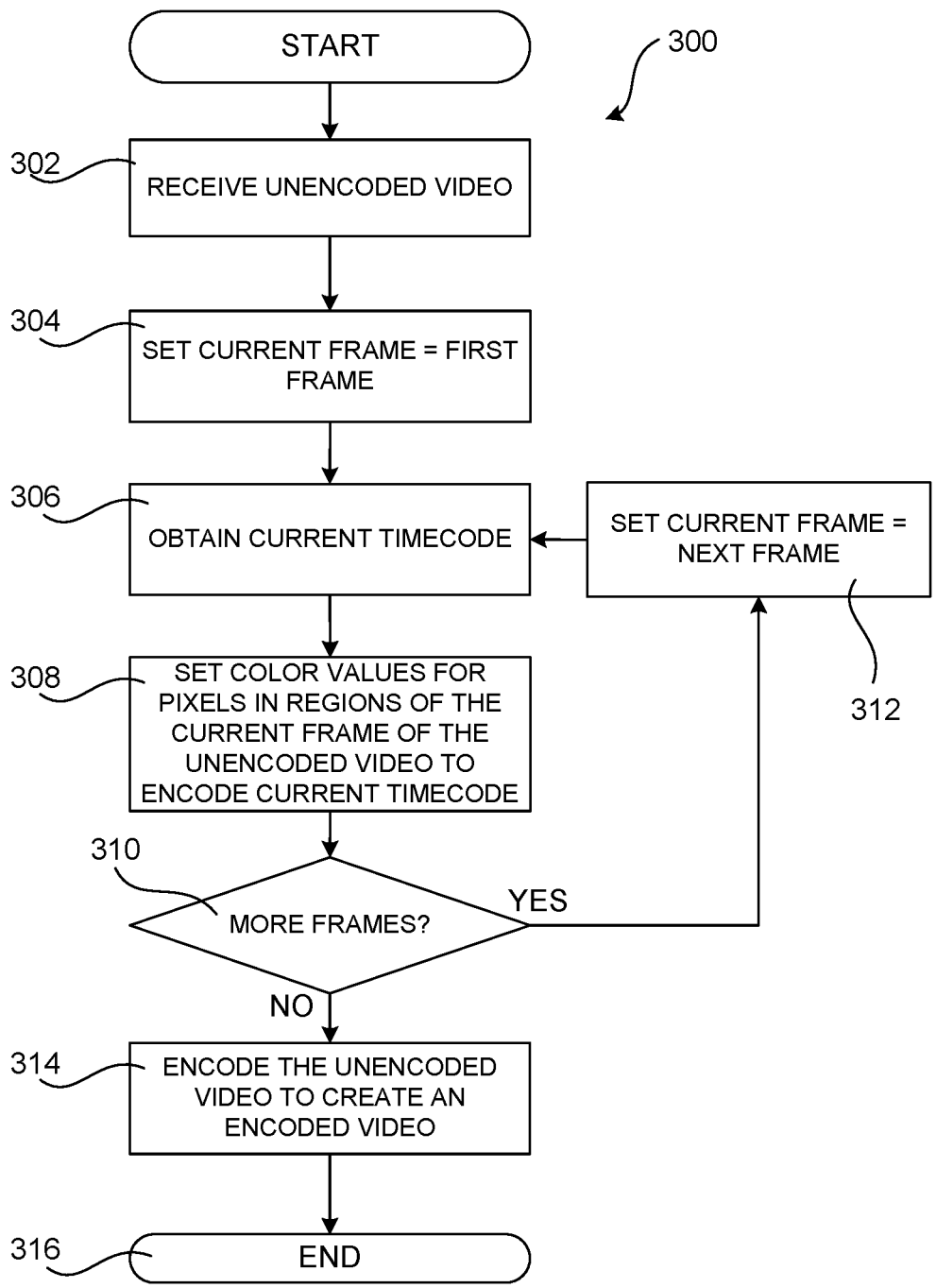
FIG. 3 is a flow diagram showing a routine that illustrates aspects of the operation of the timecode encoder shown in FIG. 1 for encoding timecode in unencoded video using colored regions of pixels, according to one particular configuration.

FIG. 3 is a flow diagram showing a routine 300 that illustrates aspects of the operation of the timecode encoder 104 shown in FIG. 1 for encoding timecode 108 in unencoded video 102 using colored regions of pixels, according to one particular configuration. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 300 begins at operation 302, where the timecode encoder 104 receives the unencoded video 102. The routine 300 then proceeds to operation 304, where the timecode encoder 104 sets the value of a temporary variable to indicate that the current frame 200 of the video 102 being processed is the first frame 200 of the video 102. The routine 300 then proceeds from operation 304 to operation 306.

At operation 306, the timecode encoder 104 obtains the current timecode 108 from the timecode feed 106. The routine 300 then proceeds from operation 306 to operation 308, where the timecode encoder 104 sets color values for the pixels 204 in regions 202 of the current frame 200 of the video 102 in the manner described above to encode the current timecode 108. The routine 300 then proceeds to operation 310.

At operation 310, the timecode encoder 104 determines if there are more frames 200 in the video 102 to be processed. If so, the routine 300 proceeds from operation 310 to operation 312, where the timecode encoder 104 increments the temporary variable utilized to keep track of the current frame 200 to identify the next frame 200 in the video 102. The routine 300 then proceeds from operation 312 to operation 306, described above.

If no additional frames 200 of the video 102 remain to be processed, the routine 300 proceeds from operation 310 to operation 314. At operation 314, the video encoder 112 encodes the unencoded video 110 that includes the encoded timecode 108 to generate an encoded video 114 that also includes the encoded timecode 108. The routine 300 then proceeds from operation 314 to operation 316, where it ends.

Figure 4:
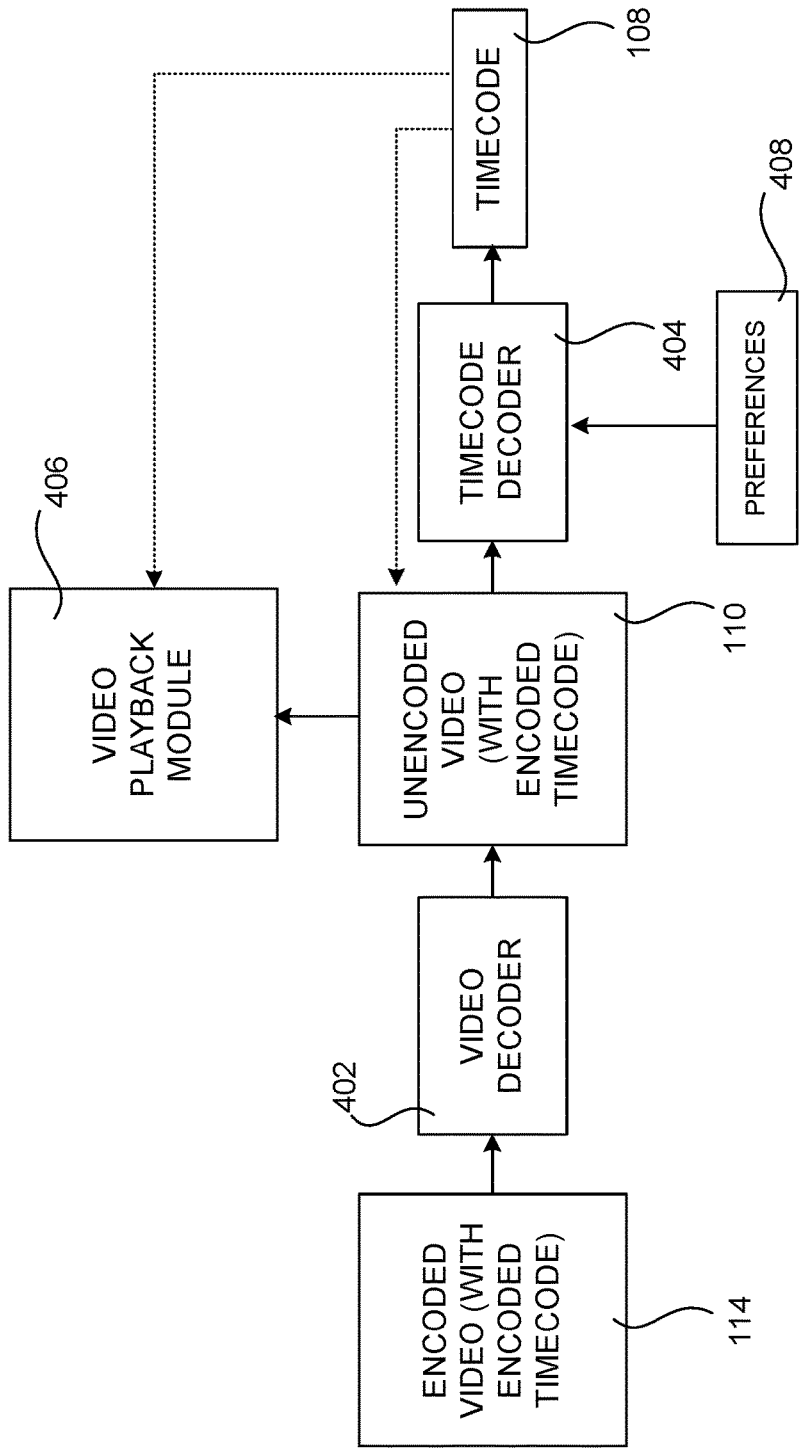
FIG. 4 is a software architecture diagram showing aspects of the operation of a timecode decoder configured to decode timecode from an unencoded video that has been encoded using colored regions of pixels, according to one particular configuration.
Figure 5:
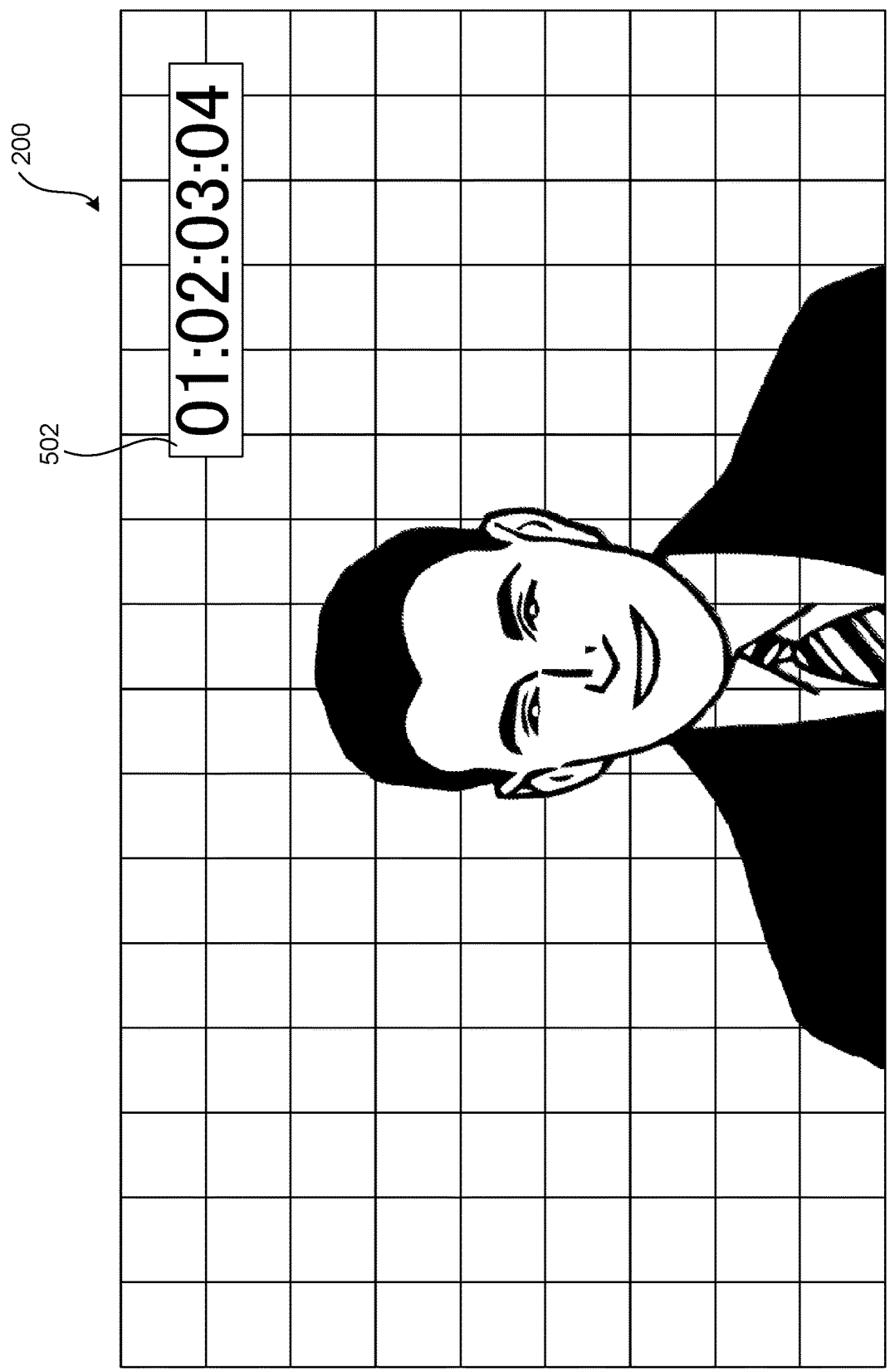
FIG. 5 is a screen diagram showing additional aspects of the frame of unencoded video shown in FIGS. 2A and 2B following decoding of the embedded timecode and display in the frame, according to one particular configuration.

FIG. 4 is a software architecture diagram showing aspects of the operation of a timecode decoder 404 configured to decode timecode 108 from an unencoded video 110 that has been encoded using colored regions of pixels, according to one particular configuration. As shown in FIG. 4, the video decoder 402 receives the encoded video 114 that has the timecode 108 encoded therein. The video decoder 402, in turn, decodes the encoded video 114 to generate the unencoded video 110, which also has the timecode 108 encoded therein.

The timecode decoder 404 receives the unencoded video 110 and decodes the timecode 108 from the video 110 through an examination of the colors of the pixels 204 in the regions 202 in the video 110. In some configurations, the timecode decoder 404 can also "burn" the timecode 108 into the unencoded video 110. In these embodiments, the timecode decoder 404 can also receive preferences 408 defining the font, size, color, and other visual characteristics of the BITC. The preferences 408 can also be utilized to instruct the timecode decode 404 to crop (or not crop) the timecode 108 from the unencoded video 110. Other preferences 408 regarding the operation of the timecode decoder 404 can also be specified in other embodiments.

As shown in FIG. 4, a video playback module 406 can also receive the timecode 108 and playback the timecode over playback of the video 110. In this manner, the timecode 108 can be displayed without modifying the pixels of the video 110. For instance, in the example shown in FIG. 5 the frame 200 of the video 110 has been displayed, including a display 502 of the decoded timecode 108 (e.g. 01:02:03:04 from the example above). Other types of displays of the timecode 108 can also be utilized.

It is to be appreciated that while the video decoder 402, timecode decoder 404, and the video playback module 406 have been illustrated separately in FIG. 4, the functionality provided by these components can also be integrated into a single component (e.g. the video playback module 406). The video playback module 406 can also be a component in a larger system including, but not limited to, a caption authoring system, a music/score composition system, or an audio dubbing system. Other configurations are also contemplated.

Figure 6:
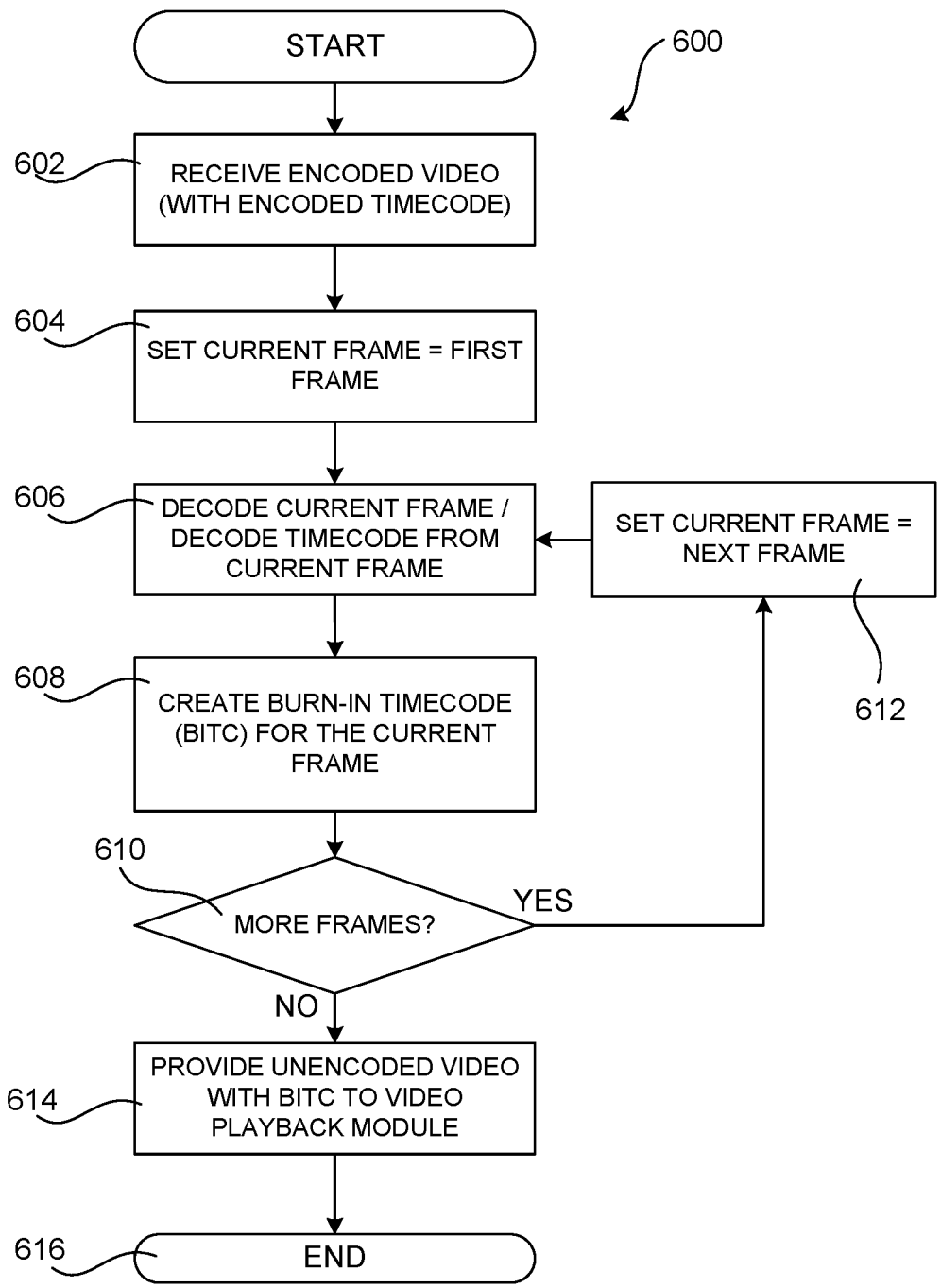
FIG. 6 is a flow diagram showing a routine that illustrates aspects of the operation of the timecode decoder shown in FIG. 4 for decoding timecode that has been encoded in a video using colored regions of pixels, according to one particular configuration.

FIG. 6 is a flow diagram showing a routine that illustrates aspects of the operation of the timecode decoder shown in FIG. 4 for decoding timecode from video that has been encoded using colored regions of pixels, according to one particular configuration. The routine 600 begins at operation 602, where the video decoder 402 receives the encoded video 114 that has the timecode 108 embedded therein. The routine 600 proceeds to operation 604, where the video decoder 402 sets a variable for keeping track of the current frame 200 of the video 114 to the first frame 200 of the video 114. The routine 600 then proceeds to operation 606.

At operation 606, the video decoder 402 decodes the current frame 200 of the video 114. Once the current frame 200 has been decoded, the timecode decoder 404 can decode the encoded timecode 108 for the current frame 200 from the unencoded video 110. Once the timecode 108 for the current frame 200 has been generated, the routine 600 proceeds to operation 608, where the video decoder 402 (or timecode decoder 404) can generate BITC for the current frame 200. In this manner, the timecode 108 can be displayed in a human-readable format by the video playback module 406.

As discussed above, in other embodiments the BITC is not generated, but rather the video playback module 406 displays the timecode 108 as human-readable digits over the playback of the video 110 without modifying the video 110. The timecode 108 can be displayed in other ways in other configurations.

From operation 607, the routine 600 proceeds to operation 610, where the video decoder 402 determines whether there are additional frames 200 in the video 114 to be decoded. If so, the routine 600 proceeds to operation 612, where the variable utilized to keep track of the current frame 200 is updated to identify the next frame 200 in the video 114.

If no additional frames 200 remain to be decoded, the routine 600 proceeds to operation 614, where the unencoded video 110 with the BITC can be provided to the video playback module 406 for playback. In other embodiments, the timecode 108 is provided to the video playback module 406 on-the-fly while frames 200 of the video 114 are being decoded. In this way, the video playback module 406 can display the timecode 108 with the playback of the video 110 as the frames 200 of the video 110 are being decoded. Other configurations are also contemplated. From operation 614, the routine 600 proceeds to operation 616, where it ends.

Figure 7:
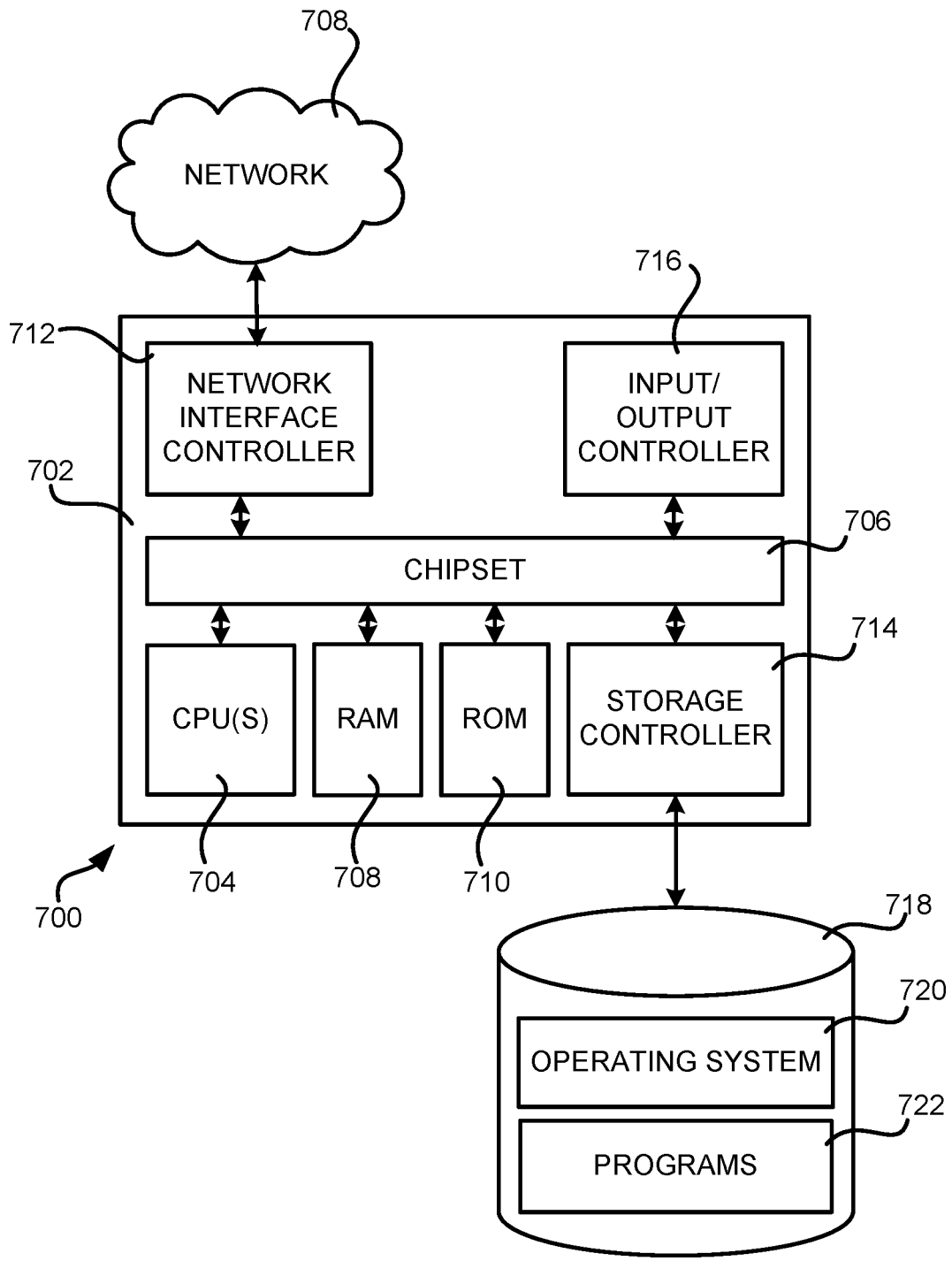
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-6. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or can utilize an architecture completely different than that shown in FIG. 7.

Based on the foregoing, it should be appreciated that technologies for encoding timecode in video using colored regions of pixels have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
at least one non-transitory computer-readable storage medium comprising instructions stored thereupon which, executed by the one or more processors, cause the system to:
receive unencoded video, the unencoded video comprising a plurality of unencoded video frames;
create a modified unencoded video by encoding one or more timecodes of a plurality of timecodes of a timecode feed into corresponding unencoded video frames, the encoding of a timecode of the one or more timecodes being by setting color values for pixels in one or more predetermined areas of a corresponding unencoded video frame, a predetermined area of the one or more predetermined areas comprising a plurality of regions in a row of a plurality of rows of the corresponding unencoded video frame, the plurality of regions including a first pair of regions and a second pair of regions, the color values comprising a first pair of color values associated with the first pair of regions and a second pair of color values associated with the second pair of regions, the first pair of color values representing a first set of a plurality of different sets of binary numbers, the first set representing a first alphanumeric symbol of a plurality of different alphanumeric symbols, the second pair of color values representing a second set of the plurality of different sets of binary numbers, the second set representing a second alphanumeric symbol of the plurality of different alphanumeric symbols, a first total number of the plurality of different sets of binary numbers being the same as a second total number of the plurality of different alphanumeric symbols; and
encode the modified unencoded video to create an encoded video.

2. The system of claim 1, wherein the plurality of regions comprise a plurality of adjacent regions, and wherein the plurality of adjacent regions are a same size as macroblocks used by a video encoder and are aligned to boundaries of the macroblocks used by the video encoder.

3. The system of claim 1, wherein the plurality of regions comprise a plurality of adjacent regions, and wherein the plurality of adjacent regions are located along a top row of the corresponding unencoded video frame.

4. The system of claim 1, wherein the at least one non-transitory computer-readable storage medium has further instructions to encode a per-frame checksum for the timecode by setting the color values for one or more pixels to correspond to the per-frame checksum.

5. The system of claim 1, wherein the first pair of regions and the second pair of regions are located along at least one of a top row or a bottom row of the corresponding unencoded video frame.

6. The system of claim 1, wherein the color values are in a color plane and at least two of the color values are located at opposite sides of the color plane.

7. The system of claim 1, wherein a first color value of the first pair of color values is located opposite to a second color value of the first pair of color values on a color plane.

8. The system of claim 1, wherein the first pair of color regions is adjacent to the second pair of color regions.

9. A computer-implemented method, comprising:
receiving unencoded video, the unencoded video comprising a plurality of unencoded video frames;
creating a modified unencoded video by encoding one or more timecodes of a plurality of timecodes in a timecode feed into corresponding unencoded video frames, the encoding of a timecode of the one or more timecodes being by setting color values for pixels in one or more predetermined areas of a corresponding unencoded video frame, the one or more predetermined areas comprising a plurality of regions, the plurality of regions comprising a first pair of regions and a second pair of regions in a first row of a plurality of rows in the corresponding unencoded video frame, the color values being in a U-V color plane and comprising a first pair of color values associated with the first pair of regions and a second pair of color values associated with the second pair of regions, the first pair of color values representing a first set of a plurality of different sets of binary numbers, the first set representing a first alphanumeric symbol of a plurality of different alphanumeric symbols, the second pair of color values representing a second set of the plurality of different sets of binary numbers, the second set representing a second alphanumeric symbol of the plurality of different alphanumeric symbols, a first total number of the plurality of different sets of binary numbers being the same as a second total number of the plurality of different alphanumeric symbols, wherein a first color value of the first pair of color values is at a first side of the U-V color plane, and a second color value of the color values is at a second side of the U-V color plane that is different than the first side; and encoding the modified unencoded video to create an encoded video.

10. The computer-implemented method of claim 9, wherein the plurality of regions are a same size as macroblocks used by a video encoder and are aligned to boundaries of the macroblocks used by the video encoder.

11. The computer-implemented method of claim 9, wherein the first row is a top row of the corresponding unencoded video frame.

12. The computer-implemented method of claim 9, further comprising setting color values for one or more pixels in one or more predetermined areas of the corresponding unencoded video frame to encode data indicating that at least one timecode is encoded in the modified unencoded video.

13. The computer-implemented method of claim 9, wherein the first row is a bottom row of the corresponding unencoded video frame.

14. A computer-implemented method, comprising:

decoding an encoded video to provide a decoded video, the decoded video comprising a plurality of decoded video frames, one or more decoded video frames of the plurality of decoded video frames comprising one or more predetermined areas, the one or more predetermined areas comprising an added row of pixels that contains an encoded timecode for the one or more decoded video frames, a predetermined area of the one or more predetermined areas comprising a plurality of regions in the added row, the plurality of regions including a first pair of regions and a second pair of regions;

reading color values for pixels in the one or more predetermined areas, the color values encoding timecodes for corresponding frames of the one or more decoded video frames, the color values comprising a first pair of color values associated with the first pair of regions and a second pair of color values associated with the second pair of regions, the first pair of color values representing a first set of a plurality of different sets of binary numbers, the first set representing a first alphanumeric symbol of a plurality of different alphanumeric symbols the second pair of color values representing a second set of the plurality of different sets of binary numbers, the second set representing a second alphanumeric symbol of the plurality of different alphanumeric symbols, a first total number of the plurality of different sets of binary numbers being the same as a second total number of the plurality of different alphanumeric symbols;

removing the added row of pixels; and decoding the color values in the one or more predetermined areas to generate the timecodes for the corresponding frames of the one or more decoded video frames.

15. The computer-implemented method of claim 14, wherein decoding the color values in the one or more predetermined areas comprises determining color values for pixels in the plurality of regions to decode the encoded timecodes in a decoded video frame.

16. The computer-implemented method of claim 14, wherein the plurality of regions comprise a plurality of adjacent regions, and wherein the plurality of adjacent regions are a same size as macroblocks used by a video encoder and are aligned to boundaries of the macroblocks used by the video encoder.

17. The computer-implemented method of claim 14, wherein the plurality of regions comprise a plurality of adjacent regions, and wherein the plurality of adjacent regions are located along at least one of a top row or a bottom row of a plurality of rows in a decoded video frame.

18. The computer-implemented method of claim 14, wherein:

the plurality of regions comprise a plurality of adjacent regions; and the plurality of adjacent regions are located along at least one of a left side or a right side of a decoded video frame.

19. The computer-implemented method of claim 14, wherein a first color value of the first pair of color values is located opposite to a second color value of the first pair of color values on a color plane.

20. The computer-implemented method of claim 14, wherein the first pair of regions is adjacent to the second pair of regions.

* * * * *